United States Patent [19]
Hattori et al.

[11] Patent Number: 5,279,893
[45] Date of Patent: Jan. 18, 1994

[54] PREPREGS, PROCESS FOR PRODUCING THE SAME AND LAMINATES PRODUCED WITH THE SAME

[75] Inventors: Toshihiro Hattori; Takashi Murata; Kazuya Goto; Takeshi Kato; Shigetsugu Hayashi; Hisashi Tada; Masahiro Sugimori, all of Nagoya, Japan

[73] Assignee: Mitsubishi Rayon Co., Ltd., Tokyo, Japan

[21] Appl. No.: 800,015

[22] Filed: Nov. 29, 1991

[30] Foreign Application Priority Data

| Nov. 29, 1990 [JP] | Japan | 2-331834 |
| Mar. 1, 1991 [JP] | Japan | 3-036102 |
| Mar. 20, 1991 [JP] | Japan | 3-057023 |
| Mar. 20, 1991 [JP] | Japan | 3-057024 |
| Mar. 20, 1991 [JP] | Japan | 3-057025 |
| Mar. 20, 1991 [JP] | Japan | 3-057026 |
| Mar. 20, 1991 [JP] | Japan | 3-057027 |

[51] Int. Cl.⁵ .................... B32B 5/12; B32B 5/22; B32B 27/38
[52] U.S. Cl. ................ 428/298; 428/113; 428/114; 428/302; 428/408; 428/902
[58] Field of Search ........... 428/408, 413, 902, 298, 428/302, 113, 114

[56] References Cited

U.S. PATENT DOCUMENTS

| 3,472,730 | 10/1969 | Frigstad | 161/144 |
| 4,543,286 | 9/1985 | Harpell et al. | 428/292 |
| 4,574,108 | 3/1986 | Fakirov et al. | 428/292 |
| 4,604,319 | 8/1986 | Evans et al. | 428/114 |
| 5,002,821 | 3/1991 | Browne et al. | 428/294 |
| 5,028,478 | 7/1991 | Odagiri et al. | 428/294 |

FOREIGN PATENT DOCUMENTS

| 0230631 | 8/1987 | European Pat. Off. |
| 0240421 | 10/1987 | European Pat. Off. |
| 132669 | 11/1974 | Japan |

OTHER PUBLICATIONS

Database WPIL, AN 83-45861K, & JP-A-58-057-437, Apr. 5, 1983.
Database WPIL, AN 89-274953, & JP-A-1-200-914, Aug. 14, 1989.

Primary Examiner—George F. Lesmes
Assistant Examiner—Kathryne E. Shelborne
Attorney, Agent, or Firm—Oblon, Spivak, McClelland, Maier & Neustadt

[57] ABSTRACT

A prepreg for fiber-reinforced composite materials comprising (A) a reinforcing fiber having a modulus of elasticity of 200 GPa or more, (B) a fibrous thermoplastic resin having a modulus of elasticity of 100 GPa or less, and (C) a thermosetting matrix resin. The prepreg of the present invention does not only have excellent handling property equivalent to that of the prepreg with the conventional thermosetting resin as a matrix, but also gives excellent toughness to the resulting molded product without injuring the thermal and mechanical properties. Particularly, it has a high resistance to interlaminar fracture when exposed to impact, so that it is preferably used as a structural material for airplanes, etc.

20 Claims, 5 Drawing Sheets

EXAMPLE 50

COMPARATIVE EXAMPLE 15

THERMOSETTING RESIN

○ REINFORCING FIBER
● FIBROUS THERMOPLASTIC RESIN

PREPREGS, PROCESS FOR PRODUCING THE SAME AND LAMINATES PRODUCED WITH THE SAME

BACKGROUND OF THE INVENTION

1. Field of the Invention

The present invention relates to a prepreg with thermosetting resins as a matrix for producing fiber-reinforced composite materials which can give excellent toughness to the resulting molded product without injuring excellent handling property and thermal and mechanical properties inherent to such the prepreg, a process for producing the same and laminates produced with the same.

2. Description of the Related Art

Advanced composite materials with high-strength, high-elastic modulus fibers (e.g. carbon fiber) as a reinforcing material have been widely used chiefly in the field of sports by effectively using their characteristics of being excellent in specific strength and specific elastic modulus.

These advanced composite materials are supplied and used in the form of an intermediate material generally called a prepreg, so that resins usually used as a matrix resin are thermosetting resins which are easy to give moderate tackiness and flexibility (draping property) necessary to laminate the prepregs.

While, however, thermosetting resins represented by epoxy resins have various characteristics of being excellent in heat resistance, solvent resistance, mechanical properties, etc. in addition to the foregoing characteristics, they have defects of being inferior in impact resistance because of their poor toughness. Particularly, when advanced composite materials are used as laminates, resistance to impact is governed in many cases by interlaminar fracture strength, so that use of thermosetting resins of poor toughness as the matrix results also in a reduction in impact resistance of the advanced composite materials. Because of this, use of the advanced composite materials, particularly, as structural materials has been fairly limited.

For improving the defect of this thermosetting matrix resin, for example a method of adding a rubber component is known. However, a large amount of the rubber component needs to be added in order to obtain a sufficient toughness-improving effect, which results in a large reduction in heat resistance, solvent resistance, etc.

Further, a method of adding thermoplastic resins, particularly the so-called engineering plastics excellent in heat resistance and solvent resistance is proposed (Japanese Patent Application Kokai No. 61-212543, No. 61-228016, No. 58-134111, etc.). These references report that reduction in heat resistance, solvent resistance, etc. is inhibited as compared with the above case wherein the rubber component is added, but a large amount of the thermoplastic resin needs to be added in order to obtain a sufficient toughness. Even in this method, however, there yet remains serious problems that the impregnation properties of the resin for producing a prepreg and the tack level of the prepreg lower with an increase in viscosity of the whole system.

Further, these trials to improve the toughness of these thermosetting matrix resins themselves are not a very effective method from the standpoint of improving the interlaminar peeling strength of the laminate. Also, a method of distributing the fine particles of thermoplastic resins between the layers is proposed (Japanese Patent Application Kokai No. 1-110537) with the object of effectively improving the interlaminar peeling strength of the laminate. However, a large reduction in tack level of the prepreg tends not to be avoided, and further problems of complicated manufacturing process and quality control newly occur. Although trials to localize chopped fibers, milled fibers, or the like between the layers also are proposed for the same object, the same problems cannot be avoided, and also the effect of the trials is usually not sufficient.

Further, a method of inserting one kind of impact-absorbing layer called an interleaf between the layers also is proposed (for example, U.S. Pat. No. 3,472,730, Japanese patent Application Kokai No. 51-58484, No. 60-63229, No. 60-231738, etc.). In any of these references, however, the thickness between the layers becomes large to lower the fiber ratio of the prepreg and the heat resistance and handling property become poor, so that this method has not yet come to find wide and practical application.

SUMMARY OF THE INVENTION

An object of the present invention is to provide a prepreg with thermosetting resins as a matrix for producing fiber-reinforced composite materials which can give excellent toughness to the resulting molded product without injuring excellent handling property and thermal and mechanical properties inherent to such the prepreg, a process for producing the same and laminates produced with the same.

The present invention relates to a prepreg for fiber-reinforced composite materials, more particularly to a prepreg comprising (A) a reinforcing fiber having a modulus of elasticity of 200 GPa or more, (B) a fibrous thermoplastic resin having a modulus of elasticity of 100 GPa or less, and (C) a thermosetting matrix resin, preferably the above prepreg for fiber-reinforced composite materials characterized in that th fibrous thermoplastic resin (B) is localized on the outer surface of the prepreg, and a process for producing the prepreg.

The first gist of the present invention consists in a blend of a base prepreg comprising a reinforcing fiber and a thermosetting matrix resin with the fibrously shaped product of a thermoplastic resin having a modulus of elasticity of 100 GPa or less. On blending this fibrous thermoplastic resin with the base prepreg so that the former is localized on the outer surface of the latter, a prepreg for fiber-reinforced composite materials is obtained which can give excellent toughness to the molded product without injuring the excellent handling property and thermal and mechanical properties inherent to the base prepreg.

PREFERRED EMBODIMENTS OF THE INVENTION

The fibrous thermoplastic resin (B) in the present invention having a modulus of elasticity of 100 GPa or less is the most important constituent in the present invention. The reason for this is that the object of the present invention of providing a prepreg for fiber-reinforced composite materials which can give excellent toughness to the molded product without injuring the excellent handling property and thermal and mechanical properties inherent to the base prepreg, can be attained only by using the fibrous thermoplastic resin. That is, by shaping the thermoplastic resin into a fiber, effective arrangement of the thermoplastic resin on the surface layer of the prepreg becomes possible. As a result, a sufficient improvement in toughness can be attained with a small amount of the thermoplastic resin, and yet the tack level of the prepreg is easy to control, so that a reduction in tack level which is a defect of the prior art does not occur. Further, there is obtained a merit of quality control being easy as compared with the prior art in which the fine particles of thermoplastic resins are added. Further, the conventional prepreg-manufacturing process can be used as it is. These effects cannot be obtained by the prior art but only by using the fibrous thermoplastic resin (B) in the present invention having a modulus of elasticity of 100 GPa or less.

As the fibrous thermoplastic resin (B) in the present invention having a modulus of elasticity of 100 GPa or less, there are preferably used fibrously shaped products of polyamide, polyester, polyethylene, polypropylene and the so-called engineering plastics and super engineering plastics such as polycarbonate, polyacetal, polyarylate, polysulfone, polyetheretherketone, polyetherimide, polyimide, polyamideimide, polyphenylene oxide, polyphenylene sulfide, polybenzimidazole and the like. The thermoplastic resin (B) in the present invention is not, however, always limited to these resins and plastics. However, fibrously shaped products of some liquid-crystal polymers, for example polyparaphenylenebenzbisthiazole and the like, polyethylene fibers having a super high modulus of elasticity produced by the special method and some aramide fibers represented by Kevlar 49 are not used because they have a modulus of elasticity of more than 100 GPa and are poor in toughness-improving effect.

As the fibrous thermoplastic resin (B) in the present invention having a modulus of elasticity of 100 GPa or less, those having a functional group which can react with the thermosetting matrix resin (C) in the molecular chain are particularly preferred, and they are properly selected depending upon the thermosetting matrix resin to be used in combination. The kind of the functional group depends upon the thermosetting matrix resin used. Examples of the functional group include amino, amide, phenolic hydroxyl, alcoholic hydroxyl, glycidyl, carboxyl, acid anhydride, mercapto, allyl, vinyl, maleimide, cyanate ester groups and the like. However, the functional group is not limited thereto so far as it can react with the thermosetting matrix resin.

The form of the fibrous thermoplastic resin is not critical so far as the resin has a sufficient length enough to be paralleled. Spun yarns obtained by spinning staple fibers also can be used, but monofilaments and multifilaments are preferred. The diameter of individual filaments is preferably 100 $\mu$m or less, particularly preferably 50 $\mu$m or less. When the thermoplastic resin is used in the form of multifilament, the diameter is preferably 1000 denier or less in total, particularly preferably 500 denier or less in total. Also, there is no particular limitation to the sectional form of the filament.

Two or more kinds of fibrous thermoplastic resin which are different in material and denier can be used in combination. The method of combination is not critical, and it will suffice to properly employ a method of alternately paralleling two kinds of fiber and a method of using a mixed filament yarn produced by the interlacing processing. Further, conjugated filament yarns having a structure such as a sheath-core structure or sea-island structure produced by simultaneously spinning two or more kinds of fibrous thermoplastic resin can also be used. To use two or more kinds of fiber different in properties in the form of conjugated filament yarn or mixed filament yarn is one of effective methods in balancing various characteristics.

The weight ratio of the fibrous thermoplastic resin (B) is preferably 0.5 to 40 parts by weight, more preferably 0.5 to 20 parts by weight based on 100 parts by weight of the thermosetting matrix resin (C). When the weight ratio is less than 0.5 part by weight, a sufficient toughness-improving effect is not obtained. When it exceeds 40 parts by weight, a further rise in the above effect is not obtained and a reduction in tack level of the prepreg occurs, which is not preferred.

It is desirable that the fibrous thermoplastic resin (B) in the present invention is localized in the vicinity of the outer surface of the prepreg. A sufficient toughness-improving effect tends not to be obtained when the thermoplastic resin is completely buried in the central part of the prepreg. However, a state wherein the thermoplastic resin has completely separated from the outer surface of the prepreg is not likewise preferred. It is desirable that the fibrous thermoplastic resin is buried in part in the thermosetting matrix resin so as not to peel off nor move at least at the time of handling. Further, it is more desirable that the fibrous thermoplastic resin is present in a state wherein it has been paralleled at regular intervals and in one direction. However, the state in which the thermoplastic resin has been localized is not always limited thereto. It is of course possible to simultaneously parallel the thermoplastic resin in two or more directions to arrange the resin in an intersecting condition. This method gives a high toughness improving effect, but there is a demerit of the process becoming complicated. The paralleling direction is not particularly limited, and the thermoplastic resin may be present at any angle with the reinforcing fiber, but paralleling the resin in the same direction as that of the reinforcing fiber is easiest for the process.

As the reinforcing fiber (A) in the present invention having a modulus of elasticity of 200 GPa or more, reinforcing fibers used in the common fiber-reinforced composite materials, for example carbon fibers, graphite fibers, boron fibers, etc., are used as they are. Preferably, however, carbon fibers and graphite fibers having a tensile strength of 3500 MPa or more are used. Among these, high-strength, high-elongation type carbon fibers and graphite fibers having a tensile strength of 4500 MPa or more and an elongation of 1.7% or more are most preferably used.

As the thermosetting matrix resin (C) in the present invention, any of resins which cure by external energy (e.g. heat, light) to at least partially form a three-dimensional cured product may be used. Typical examples include epoxy resins, maleimide resins, polyimide resins, phenolic resins, vinyl ester resins, unsaturated polyester resins, cyanic acid ester resins, resins having an acetylene terminal, resins having a vinyl terminal, resins having an allyl terminal, resins having a nadic acid terminal and mixtures thereof. Of the above resins, epoxy resins, maleimide resins, cyanic acid ester resins and mixtures of maleimide resins and cyanic acid ester resins can be given as preferred resins.

Any epoxy resin may be used, but epoxy resins with amines or phenols as a precursor are preferred. Specific examples of such the epoxy resins include tetraglycidyldiaminodiphenylmethane, triglycidyl-p-aminophenol, triglycidyl-m-aminophenol, various isomers of triglycidylaminocresol, bisphenol A type epoxy resins, bisphenol F type epoxy resins, bisphenol S type epoxy resins, phenol novolak type epoxy resins, cresol novolak type epoxy resins and the like. However, the epoxy resin in the present invention is not limited thereto. Further, brominated epoxy resins produced by brominating the above epoxy resins may also be used. These epoxy resins are used alone or properly in mixture of two or more of them.

The epoxy resin is usually used in combination with a curing agent. There is no particular limitation to the curing agent used in the present invention, and compounds having a functional group (e.g. amino group, acid anhydride group) which can react with the epoxy resin can be used properly. However, aromatic amines represented by the various isomers of diaminodiphenyl sulfone, dicyandiamide and aminobenzoic acid esters are more preferably used.

In the present invention, the maleimide resin refers to a resin composition containing a polyfunctional maleimide as a main component, being a resin composition in which a compound having two or more maleimide groups in the molecule occupies 30 wt.% or more, preferably 40 wt.% or more of the resin composition. If the content of the polyfunctional maleimide is in the above range, the resin composition may contain a monofunctional maleimide or other copolymerizable reactive compound so far as the physical properties such as heat resistance, toughness and the like do not lower.

The following compounds are given as the polyfunctional maleimide:

1,2-bismaleimidoethane, 1,6-bismaleimidohexane, 1,12-bismaleimidododecane, 1,6-bismaleimido-(2,2,4-trimethyl)hexane, 1,6-bismaleimido(2,4,4-trimethyl)hexane, 1,3-bismaleimidobenzene, 1,4-bismaleimidobenzene, 3,3'- or 4,4'-bismaleimidodiphenylmethane, 3,3'- or 4,4'-bismaleimidodiphenyl sulfone, 3,3'- or 4,4'-bismaleimidodiphenyl ether, 2,4-,2,6- or 3,4-bismaleimidotoluene, 4,4'-bismaleimidodiphenyl sulfide, 4,4'-bismaleimidodicyclohexylmethane, 4,4'-bismaleimidodicyclohexylhexane, N,N'-m- or -pxylylenebismaleimide, N,N'-m-phenylenebiscitraconimide, N,N'-4,4'-diphenylenebiscitraconimide, 2,2'-bis[4-(4-maleimidophenoxy)phenyl]propane, bis[4-(4-maleimidophenoxy)phenyl]sulfone, bis[4-(3-maleimidophenoxy)-phenyl]sulfone, 1,3'-bis(4-maleimidophenoxy)benzene, 1,3'-bis(3-maleimidophenoxy)benzene, N,N'-[1,3-phenylene-di-(2,2-propylidene)-di-p-phenylene]-bismaleimide, mixtures thereof and prepolymers comprising maleimide and diamine. As the diamine used in the prepolymers, aromatic diamines such as diaminodiphenylmethane and the like are preferred. And, 4,4'-bismaleimidodiphenylmethane and an eutectic mixture of 4,4'-bismaleimidodiphenylmethane with 1,6-bismaleimido(2,2,4-trimethyl)hexane and bismaleimidotoluene are particularly preferred.

The reactive compound copolymerizable with the polyfunctional maleimide compound includes for example alkenylphenols such as o,o'-diallylbisphenol A, o,o'-diallylbisphenol F, etc., triallyl isocyanurate, divinylbenzene, N-vinylpyrrolidone, ethylene glycol dimethacrylate and the like. These copolymerizable reactive compounds are used alone or in mixture in a range of 70 wt.% or less, preferably 50 wt.% or less of the thermosetting matrix resin containing the polyfunctional maleimide as a main component. Of these copolymerizable reactive compounds, the alkenylphenols have an effect to improve the toughness and processability of the thermosetting matrix resin containing the polyfunctional maleimide as a main component, it being preferred to use them in a range of 10 wt.% to 50 wt.% of the matrix resin.

The thermosetting matrix resin containing the polyfunctional maleimide as a main component can easily be cured by heat, but a catalyst may be added to this matrix resin with the objects of giving desired characteristics to the cured product and regulating the curing characteristics. Those which can be used as the catalyst include organophosphines, organophosphonium salts, their complexes, imidazoles, tertiary amines, quaternary ammonium salts, boron trifluoride/amine complexes and radical polymerization catalysts such as organic peroxides, azobisisobutyronitrile, etc. The amount of the catalyst added is not to be limited in the present invention, but amounts of 0.01 to 5 wt.% based on the total amount of the matrix resin components are preferred in terms of stability.

The cyanic acid ester resin refers to a resin composition containing 50 wt.% or more of a polyfunctional cyanic acid ester represented by the formula, wherein n represents an integer of 2 to 5, and Y represents an aromatic organic residue, and its oligomer.

Those which can be used as the polyfunctional cyanic acid ester include 1,3- or 1,4-dicyanatobenzene, 4,4'-dicyanatobiphenyl, 2,2'-bis(4-cyanatophenyl)-propane, 2,2'-bis(4-cyanatophenyl)ethane, bis(4-cyanatophenyl)methane, bis(4-cyanatophenyl)sulfone, bis(4-cyanatophenyl)sulfide, bis(3,4-dimethyl-4-cyanatophenyl)methane, a compound represented by the formula (I), wherein n is 0 to 2,
and mixtures thereof.

These polyfunctional cyanic acid esters can also be used in the form of a triazine oligomer obtained by trimerization of the cyanate or a prepolymer obtained by reaction with an amine. The amine used in producing the prepolymer is preferably aromatic or aliphatic di-amines.

It does not matter if a phenol or a catalyst is added to the thermosetting matrix resin containing the polyfunctional cyanic acid ester as a main component with the objects of giving desired characteristics to the cured product and regulating the curing characteristics. As the phenol, usual alkylphenols can be used, and as the catalyst, latent curing catalysts (e.g. boron trifluoride/amine complexes), tertiary amines, organic peroxides and organic acid metal salts such as zinc octylate, tin octylate, copper naphthenate, zinc naphthenate, cobalt naphthenate and the like are preferably used. The amount of the catalyst added may properly be determined according to the object, but amounts of 0.05 to 3 wt.% based on the total amount of the matrix resin components are preferred in terms of stability.

Thermosetting resins containing a mixture of the polyfunctional maleimide (I) and polyfunctional cyanic acid ester or its oligomer (II), or a prereaction product of (I) and (II) as a main component, also are preferably used as the thermosetting matrix resin of the present invention. The ratio of (I) to (II) is not to be limited in the present invention, but the weight ratio of (I) to (II) being 5:95 to 15:85 is particularly preferred. Addition of an epoxy resin or polyester resin to the thermosetting resin containing the mixture or pre-reaction product of (I) and (II) as a main component causes no problems, but gives rather desirable results. As the epoxy resin, known ones can properly be selected, but particularly preferred epoxy resins include bisphenol F type epoxy resins, bisphenol A type epoxy resins, polyglycidyl ethers of diphenylolalkanes (e.g. diphenylolmethane, diphenylolethane, diphenylolpropane, etc.), polyglycidyl ethers of polyhydric phenols (e.g. novolak, cresol, resol, etc.), epoxy resins obtained by epoxidating alicyclic compounds (e.g. cyclohexane, cyclopentadiene, dicyclopentadiene, etc.), poly(epoxyalkyl) ethers of aliphatic polyoxy compounds (e.g. ethylene glycol, glycerin, etc.), epoxyalkyl esters of aromatic or aliphatic carboxylic acids, and the like. Further, pre-reaction products of epoxy resins disclosed, for example, in U.S. Pat. Nos. 3,390,037, 2,970,983 and 3,067,170 and curing agents, or simple mixtures of the both may be used.

As the polyester compound, compounds represented by the following formulae (2) and (3) are preferred, and compounds of which the acid component is chiefly terephthalic acid and the glycol component is chiefly neopentyl glycol or ethylene glycol are particularly preferred. The most preferred results are obtained when these polyester compounds have a number average molecular weight of 500 to 10,000, particularly 500 to 3,000 and a softening point of 100° C. or less, preferably 70° C.:

wherein Ar represents a phenylene group, $R_1$ represents a divalent aliphatic group and $R_2$ represents a divalent aromatic or aliphatic group.

Referring to the amount of the epoxy resin or polyester resin added to the thermosetting resin containing the mixture or pre-reaction product of (I) and (II) as a main component, the amount of the epoxy resin is 5 to 100 parts by weight based on 100 parts by weight of the above mixture or pre-reaction product, and the amount of the polyester resin is 5 to 50 parts by weight based on 100 parts by weight of the same. In many cases, however, amounts of 30 parts by weight or less is sufficient for any of the epoxy resin and polyester resin.

A catalyst may also be added according to the object to the thermosetting resin containing the mixture or pre-reaction product of (I) and (II) as a main component. This catalyst may properly be selected according to the object from those which were hereinbefore given in the explanation of curing of the thermosetting matrix resin containing as a main component the polyfunctional maleimide or polyfunctional cyanic acid ester. The amount of the catalyst added also may be determined according to the object, but amounts of 0.2 to 3 parts by weight based o the total amount of the matrix resin components are preferred in terms of stability.

As the thermosetting matrix resin (C) in the present invention, a blend of the above thermosetting resin and a thermoplastic resin or its oligomer may be used. Particularly, the so-called engineering plastics such as polyimide, polyetherimide, polysulfone, polyethersulfone, polyetheretherketone, etc. are preferred in terms of heat resistance, and those having a functional group which can react with the thermosetting resin in the terminal of the molecule or in the molecular chain are further preferred. These thermoplastic resins may be dissolved in the thermosetting matrix resin or mixed therewith in the form of fine powder.

The amount of the thermoplastic resin component added is preferably 30 wt.% or less, more preferably 15 wt.% or less based on the thermosetting resin component. When the amount is more than 30 wt.%, the viscosity of the system becomes too high, which causes not only poor impregnation at the time of production of prepregs, but also a large reduction in tack characteristics and drape characteristics of the prepreg.

Also, to the thermosetting resin may be added small amounts of an inorganic fine particle (e.g. finely powdered silica) or elastomer component (e.g. butadiene/acrylonitrile copolymer) so far as the prepreg characteristics, processing characteristics, mechanical characteristics, thermal characteristics and the like are not sacrificed.

The ratio of the reinforcing fiber (A) having a modulus of elasticity of 200 GPa or more and the thermosetting matrix resin (C) may properly be determined according to the object, but the ratio of (A) to (C) is in a range of preferably 55:45 to 85:15 by weight, more preferably 60:40 to 75:25 by weight.

When the thermosetting matrix resin is composed mainly of the epoxy resin, it is preferred that the ratio of (A) to (C) is 60:40 to 75:25 and that of (B) to (C) is 0.5:100 to 20:100. When the thermosetting matrix resin is composed mainly of the polyfunctional maleimide, polyfunctional cyanic acid ester or the mixture or pre-reaction product of the both, it is desirable that the ratio of (A) to (C) is 60:40 to 75:25 and that of (B) to (C) is 0.5:100 to 40:100.

For producing the prepreg from the reinforcing fiber (A) having a modulus of elasticity of 200 GPa or more, thermosetting matrix resin (C) and fibrous thermoplastic resin (B) having a modulus of elasticity of 100 GPa or less, the following methods can be given. The present invention should not, however, be limited to these methods.

Process 1

A process of arranging a fibrous thermoplastic resin (B) on a base prepreg obtained from a reinforcing fiber (A) and a thermosetting matrix resin (C), after which heating and impregnation are carried out.

Process 2

A process of simultaneously supplying a reinforcing fiber (A) and a fibrous thermoplastic resin (B) to a release paper coated with a thermosetting matrix resin (C), after which impregnation is carried out.

Process 3

A process of arranging and fixing a fibrous thermoplastic resin (B) on a release paper coated with a thermosetting matrix resin (C) and laying a reinforcing fiber (A) thereon, after which impregnation is carried out.

Figure 1:
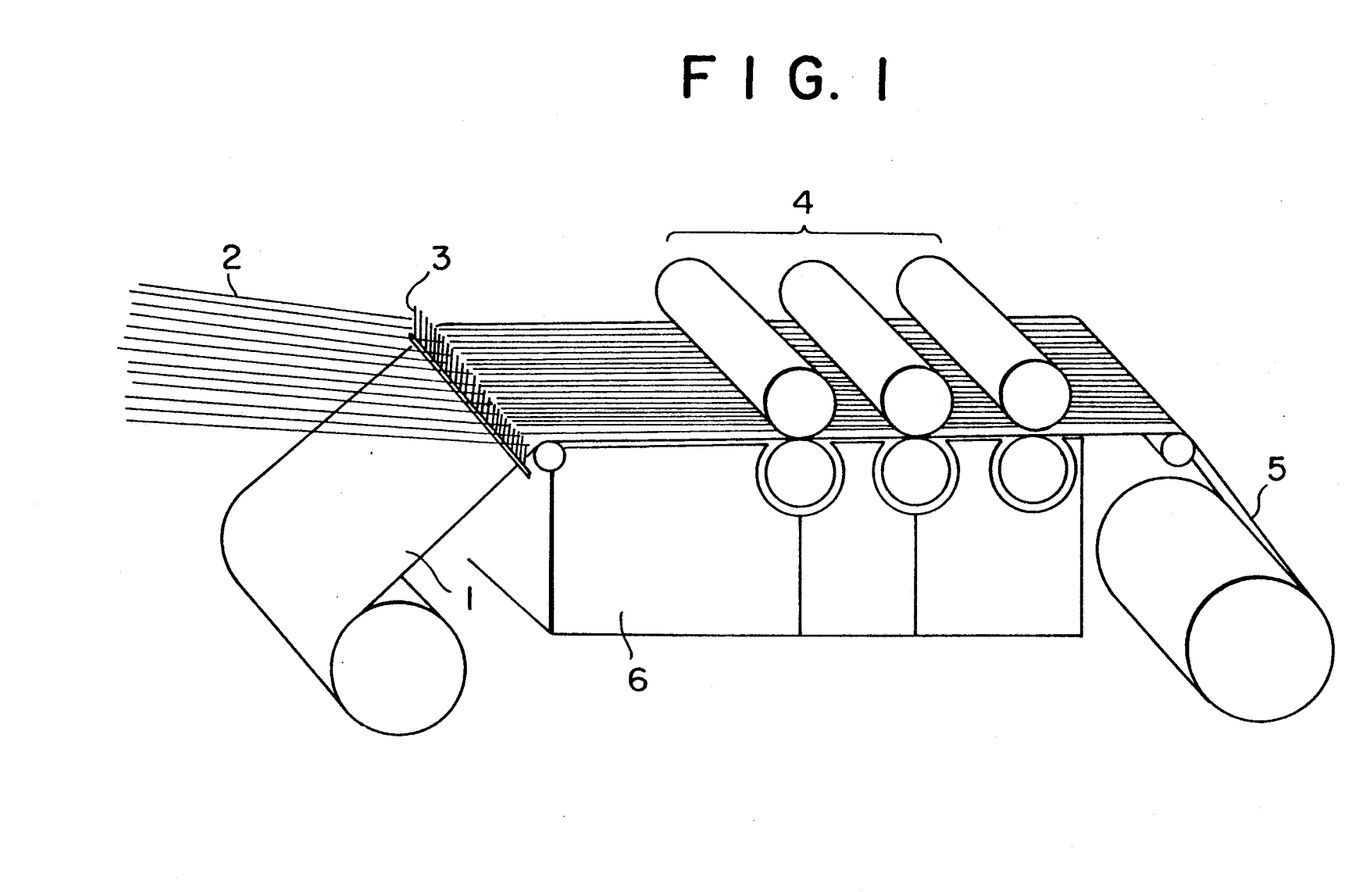
FIG. 1 shows a process in which a fibrous thermoplastic resin is arranged on a base prepreg obtained from a reinforcing fiber and a thermosetting matrix resin, after which heating and impregnation are carried out.

A process shown in FIG. 1 can be given as a specific example of the process 1.

Figure 2:
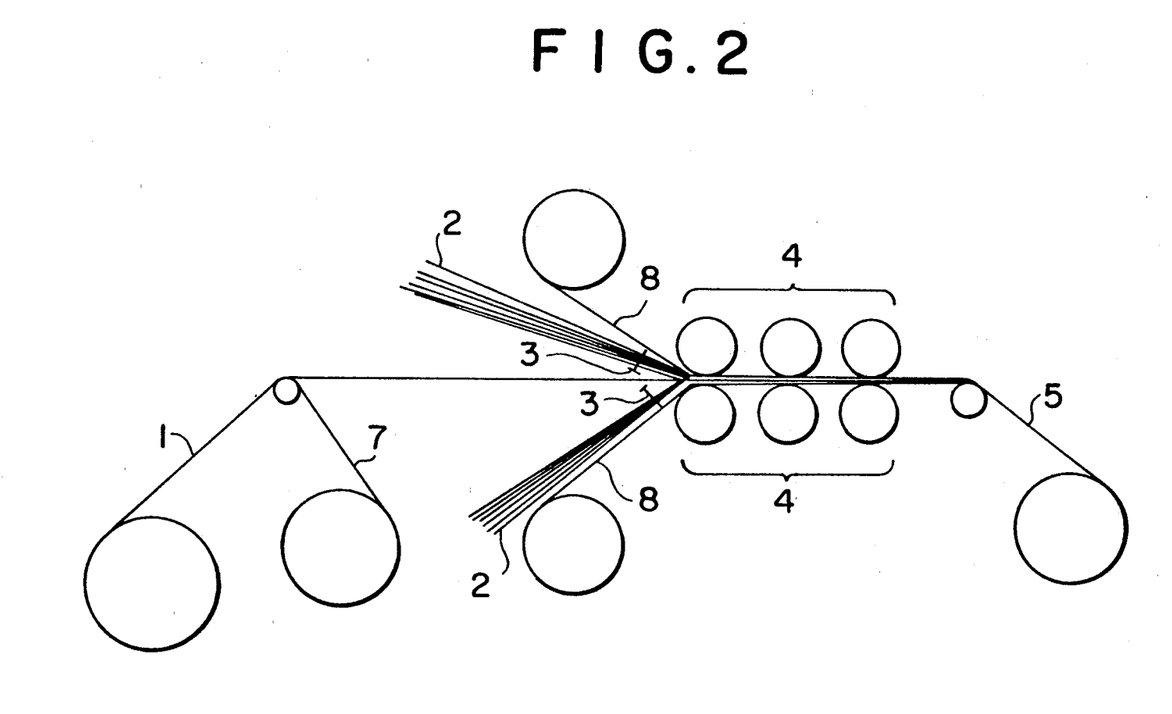
FIG. 2 shows a process in which a fibrous thermoplastic resin is simultaneously arranged on the both sides of a base prepreg.

A base prepreg 1 comprising a reinforcing fiber (A) and a thermosetting matrix resin (C) is led to an impregnation table 6, and then a fibrous thermoplastic resin (B) 2 is arranged on the base prepreg through a regulation comb 3, impregnated into and fixed to the base prepreg with a heating pressure roller 4 to obtain a prepreg 5. When the fibrous thermoplastic resin is to be arranged on the both sides of the base prepreg, there are two processes. In one process, the prepreg in which the thermoplastic resin 2 has been arranged on one side is again passed through the same process as above to arrange the thermoplastic resin 2 on the other side. In the other process, the thermoplastic resin 2 is simultaneously arranged on the both sides of the prepreg as shown in FIG. 2. Any process may be used.

Referring more particularly to the process shown in FIG. 2, a release paper 7 is peeled off the back side of the base prepreg 1, a fibrous thermoplastic resin 2 is arranged on the both sides of the base prepreg through the regulation comb 3, and the thermoplastic resin 2 on the both sides is covered with a release paper 8, after which heat and pressure are applied to the both sides with a heating pressure roller 4. Thus, there can be obtained a prepreg in which the fibrous thermoplastic resin 2 has been localized on the surface of the base prepreg, and besides a part of the thermoplastic resin 2 has been buried in the base prepreg.

For producing the base prepreg from the reinforcing fiber and thermosetting matrix resin, the common prepreg-manufacturing methods can be used as they are. Of these methods, the so-called hot melt method is preferred in which the resin is heated and melted using no solvent and coated onto a release paper, after which heating and impregnation are carried out. However, the so-called lacquer method also can be used in which the resin is coated onto a release paper in solution in a solvent, and after impregnation, the solvent is removed.

Figure 3:
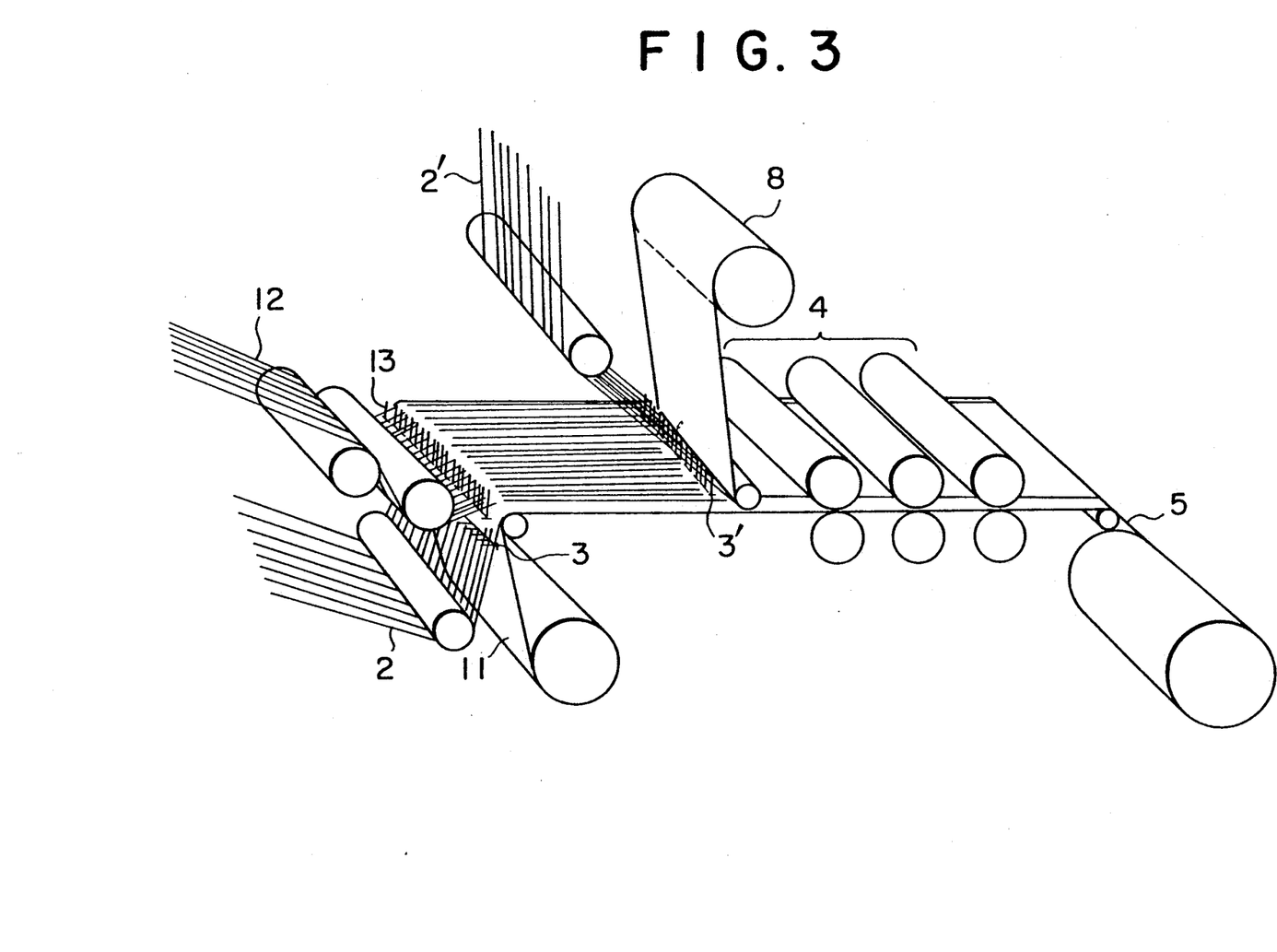
FIG. 3 shows a process in which a reinforcing fiber and a fibrous thermoplastic resin are simultaneously supplied to a release paper coated with a thermosetting matrix resin, after which impregnation is carried out.

A process shown in FIG. 3 can be given as a specific example of the process 2.

Onto a release paper 11 coated with a thermosetting matrix resin (C) are arranged a reinforcing fiber (A) 12 and a fibrous thermoplastic resin (B) 2, 2' through combs 13, 3, 3' so that the width and pitch of the fiber 12 and resin 2,2' have the predetermined values, and then a release paper 8 for protecting the fiber is supplied thereto, after which heat and pressure are applied with a heating pressure roller 4 to impregnate the thermosetting matrix resin into the fiber. Thus, a desired prepreg 5 is obtained. When the fibrous thermoplastic resin is to be arranged only on one side of the prepreg, it will suffice to supply either one of the fibrous thermoplastic resin 2 and 2'.

Figure 4:
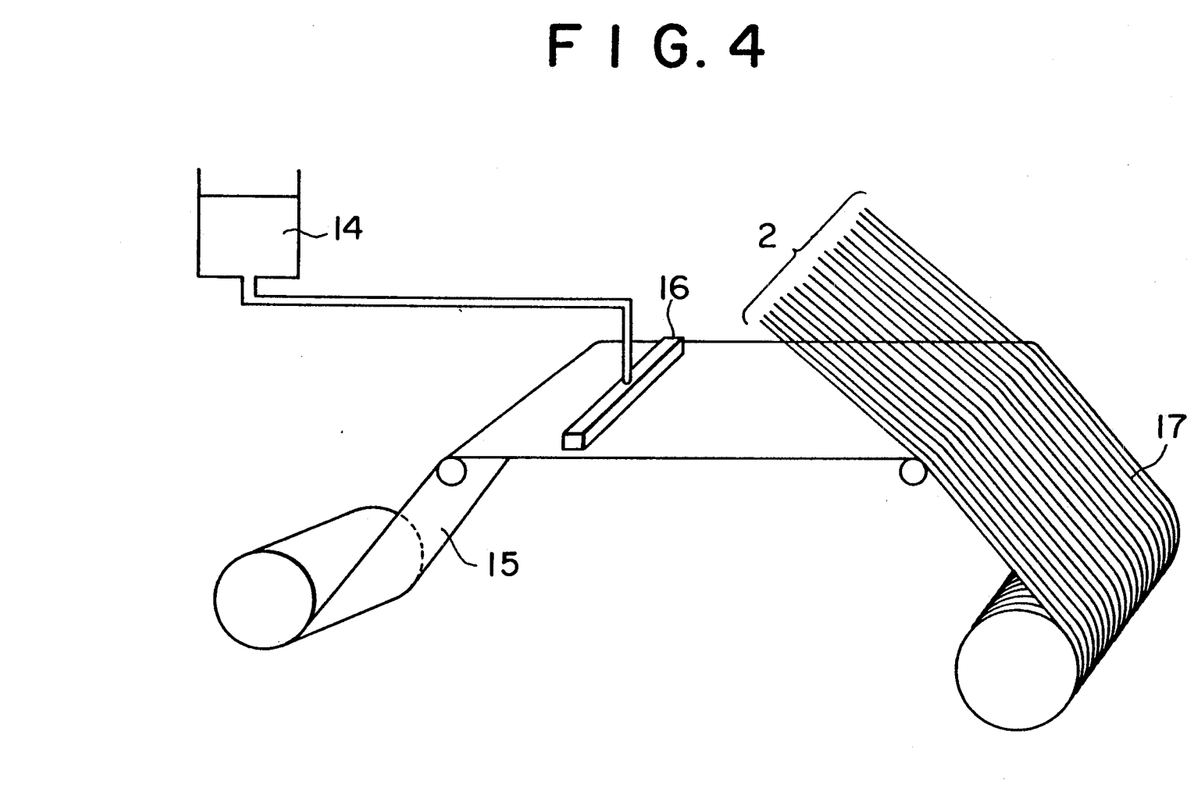
FIG. 4 shows a process in which a fibrous thermoplastic resin is arranged on and fixed to a release paper coated with a thermosetting matrix resin, and a reinforcing fiber is laid thereon, after which impregnation is carried out.

As a specific example of the process 3, there can be given a prepreg-manufacturing process shown in FIG. 4 in which a fibrous thermoplastic resin (B) 2 is arranged on and fixed to a release paper 15 coated with a thermosetting matrix resin (C) 14 using a coater 16, after which a reinforcing fiber is laid on the resulting resin film 17 and impregnation is carried out by the usual method.

The prepreg of the present invention does not only have excellent handling property equivalent to that of the prepreg with the conventional thermosetting resin as a matrix, but also gives excellent toughness to the resulting molded product without injuring the thermal and mechanical properties. Particularly, it has a high resistance to interlaminar fracture when exposed to impact, so that it is preferably used as a structural material for airplanes, etc.

The present invention will be illustrated specifically with reference to the following examples.

In the examples, all parts are by weight. The epoxy resins used are as shown below:
Tetraglycidyldiamine type epoxy resin:
YH434L (trade name of Toto Kasei Co., Ltd.)
Triglycidyldiamine type epoxy resin:
ELM-100 (trade name of Sumitomo Chemical Co., Ltd.)
Bisphenol A type epoxy resin:
Epikote 828 (trade name of Yuka Shell Co., Ltd.)
Bisphenol F type epoxy resin:
Epikote 807 (trade name of Yuka Shell Co., Ltd.)

EXAMPLES 1 TO 3

A unidirectional base prepreg was produced by the hot melt method from the resin composition shown in Table 1 and a high-strength, medium-elastic modulus carbon fiber (trade name, MR60P; produced by Mitsubishi Rayon Co., Ltd.; tensile strength, 5600 MPa; modulus of elasticity, 310 GPa; elongation at breaking point, 1.9%). The CF weight of the base prepreg was 145 g/m², and the resin content thereof was 34 wt.%.

This base prepreg was wound at the both sides; number of filaments, 24 fil) by the filament winding method so that the fiber weight per side was 3 g/m². Thus, the prepreg of the present invention was obtained. The prepreg thus obtained was such a one that the nylon multifilaments had been localized on its both sides and a part of the nylon multifilaments had been buried in the base prepreg.

According to Recommended Method SRM2-88 of SACMA (Suppliers of Advanced Composite Materials Association), this prepreg was cut into small pieces of predetermined dimensions which were then laid one upon another and subjected to autoclave molding to obtain test pieces for measuring compressive strength after application of impact (curing condition, 180° C.×2 hours). Thereafter, the compressive strength after application of 270 lb-in impact was measured using the test piece to obtain the results shown in Table 1.

As is apparent from Table 1, the molded products obtained from the prepreg of the present invention have a high compressive strength after application of impact, being excellent in impact resistance, as compared with those obtained in the comparative examples.

COMPARATIVE EXAMPLES 1 TO 3

A unidirectional base prepreg was produced in the same manner as in Example 1 except that a resin film in which the resin content of the prepreg was 36 wt.%, was used. Evaluation was carried out in the same manner as in Example 1 except that the nylon 12 multifilaments were not adhered to this base prepreg. The results are shown together in Table 1.

TABLE 1

|  |  | Example | | | Comparative Example | | |
|---|---|---|---|---|---|---|---|
|  |  | 1 | 2 | 3 | 1 | 2 | 3 |
| Blending of components (C) | Tetraglycidyldiamine type epoxy resin (YH 434L) | 80 | 40 | 40 | 80 | 40 | 40 |
|  | Triglycidyldiamine type epoxy resin (ELM-100) | 0 | 40 | 40 | 0 | 40 | 40 |
|  | Bishpenol A type epoxy resin (Epikote 828) | 20 | 20 | 20 | 20 | 20 | 20 |
|  | Diaminodiphenyl sulfone | 32 | 40 | 40 | 32 | 40 | 40 |
|  | BF3 monoethylamine | 0.5 | 0 | 0 | 0.5 | 0 | 0 |
|  | Polyether sulfone |  | - | 10 |  |  | 10 |
| B | Nylon 12 |  |  |  |  |  |  |
|  | (phr) | 8.07 | 8.07 | 8.07 | 0 | 0 | 0 |
|  | (g/m²) | 6.0 | 6.0 | 6.0 | 0 | 0 | 0 |
| Compressive strength after application of impact (MPa) |  | 315 | 320 | 335 | 165 | 175 | 235 |

Note:
phr: Part by weight per 100 parts by weight of the thermosetting matrix resin.
g/m²: Weight (g) per 1 m² of the prepreg.

EXAMPLES 4 TO 6 AND COMPARATIVE EXAMPLES 4 TO 6

In the same manner as in Example 1, a base prepreg having a CF weight of 190 g/m² and a resin content of 34 wt.% was obtained from MR60P and the resin composition shown in Table 2. This base prepreg was wound at the both sides with nylon 12 multifilaments (81 d, 36 fil) at a pitch of 3 mm by the filament winding method. Thus, the prepreg of the present invention was obtained. This prepreg also was such a one that the nylon multifilaments had been localized on its both sides and a part of the nylon multifilaments had been buried in the base prepreg. Using this prepreg, the compressive strength after application of impact was evaluated in the same manner as in Example 1.

Further, a prepreg was similarly produced using a resin film having a resin content of 36 wt.%, and the compressive strength after application of impact was evaluated without adhering the nylon multifilaments to the prepreg.

The results are collectively shown in Table 2.

TABLE 2

|  |  | Example | | | Comparative Example | | |
|---|---|---|---|---|---|---|---|
|  |  | 4 | 5 | 6 | 4 | 5 | 6 |
| Blending of components (C) | Tetraglycidyldiamine type epoxy resin (YH 434L) | 40 | 40 | 40 | 40 | 40 | 40 |
|  | Triglycidyldiamine type epoxy resin (ELM-100) | 20 | 40 | 40 | 20 | 40 | 40 |
|  | Bishpenol A type epoxy resin (Epikote 828) | 40 | 20 | 20 | 40 | 20 | 20 |
|  | Diaminodiphenyl sulfone | 50 | 50 | 50 | 50 | 50 | 50 |
|  | Polyether sulfone |  |  | 10 |  |  | 10 |
| (B) | Nylon 12 |  |  |  |  |  |  |
|  | (phr) | 6.13 | 6.13 | 6.13 | 0 | 0 | 0 |
|  | (g/m²) | 6.0 | 6.0 | 6.0 | 0 | 0 | 0 |
| Compressive strength after application of impact (MPa) |  | 338 | 327 | 335 | 225 | 180 | 237 |

EXAMPLES 7 TO 10

A prepreg was produced in the same manner as in Example 4 except that the pitch of the nylon 12 multifilament used was changed as shown in Table 3. The compressive strength after application of impact was measured in the same manner as in Example 1. The results obtained are shown in Table 3.

TABLE 3

|  |  | Example 7 | Example 8 | Example 9 | Example 10 |
|---|---|---|---|---|---|
| Component (B) (Nylon 12) | Pitch (mm) | 1 | 2 | 4 | 5 |
|  | Weight (g/m²) | 15 | 7.5 | 3.75 | 3.0 |
| Compressive strength after application of impact (MPa) |  | 365 | 364 | 327 | 308 |

EXAMPLES 11 TO 15

A prepreg was produced in the same manner as in Example 1 except that the total denier, number of filaments and pitch of the nylon 12 multifilament used were changed as shown in Table 4, and the compressive strength after application of impact was measured. The results obtained are shown in Table 4.

TABLE 4

|  |  | Example 11 | Example 12 | Example 13 | Example 14 | Example 15 |
|---|---|---|---|---|---|---|
| Component (B) (Nylon 12) | Total denier (d) | 81 | 81 | 81 | 81 | 81 |
|  | Number of filaments | 36 | 12 | 1 | 1 | 1 |
|  | Radius of filament (μ) | 8.9 | 15.4 | 53.3 | 40 | 70 |
|  | Pitch (mm) | 2.5 | 2.5 | 2.5 | 1.67 | 5 |
|  | Amount (g/m²) | 6.0 | 6.0 | 6.0 | 6.0 | 6.0 |
| Compressive strength after application of impact (MPa) |  | 338 | 336 | 323 | 333 | 316 |

EXAMPLE 16

A prepreg was produced in the same manner as in Example 4 except that nylon 6,12 monofilament (modulus of elasticity, about 2 GPa; total denier, 90 d) was used in place of the nylon 12 multifilament. The compressive strength after application of impact was then measured to find that it was 325 MPa.

EXAMPLE 17

Six hundreds and eighty grams of a bisphenol F type epoxy resin (Epikote 807), 477 g of triglycidyldiamine type epoxy resin (ELM-100) and 426 g of tetramethylbisphenol A were charged into a reactor and reacted at 120° C. for 8 hours to obtain a pre-reaction product. Thirty-five parts by weight of this prereaction product, 25 parts by weight of Epikote 807, 40 parts by weight of a tetraglycidyldiamine type epoxy resin (YH434L) and 50 parts by weight of diaminodiphenyl sulfone were blended and thoroughly mixed until the whole became uniform.

A unidirectional base prepreg was produced by the hot melt method from the resin composition obtained and a high-strength, medium-elastic modulus carbon fiber (MR60P). The CF weight of this base prepreg was 190 g/m², and the resin content thereof was 34 wt.%. This base prepreg was wound at the both sides with nylon 12 multifilaments (81 d, 36 fil) at a pitch of 3 mm to obtain the prepreg of the present invention. Using this prepreg, the compressive strength after application of impact was evaluated in the same manner as in Example 1 to find that it was 346 MPa.

COMPARATIVE EXAMPLE 7

A unidirectional base prepreg was produced in the same manner as in Example 17 except that a resin film in which the resin content of the prepreg was 36 wt.%, was used. Evaluation was carried out in the same manner as in Example 17 except that the nylon 12 multifilaments were not adhered to this base prepreg.

The compressive strength after application of impact obtained was 274 MPa.

EXAMPLE 18

A prepreg was produced in the same manner as in Example 17 except that the nylon 12 multifilament was replaced by the multifilament (modulus of elasticity, about 2 GPa; total denier, 90 d; number of filaments, 18 fil) of an amorphous nylon (Trogamid-T produced by Dynamit Nobel Co., Ltd.). The compressive strength after application of impact was then measured to find that it was 339 MPa.

EXAMPLE 19

A prepreg was produced in the same manner as in Example 17 except that a mixed filament yarn produced by doubling a Trogamid-T multifilament (90 d, 18 fil) and a nylon 12 multifilament (81 d, 36 fil) was used in place of the nylon 12 multifilament (81 d, 36 fil), and that winding was carried out at a pitch of 6 mm. The compressive strength after application of impact was then measured to find that it was 341 MPa.

EXAMPLE 20

A prepreg was produced in the same manner as in Example 17 except that a conjugated filament yarn of a sheath-core structure [90 d; 18 fil; core/sheath=50/50 (weight ratio)] of which the core portion was Trogamid-T and the sheath portion was nylon 12, was used in place of the nylon 12 multifilament. The compressive strength after application of impact was then measured to find that it was 342 MPa.

EXAMPLE 21

A prepreg was produced in the same manner as in Example 17 except that the multifilament (modulus of elasticity, about 4 GPa; total denier, 240 d; number of filaments, 24 fil) of a polyamideimide (Torlon 4000T produced by Amoco Co., Ltd.) was used in place of the nylon 12 multifilament, and that winding was carried out at a pitch of 6 mm. The compressive strength after application of impact was then measured to find that it was 336 MPa.

EXAMPLES 22 TO 24 AND COMPARATIVE EXAMPLES 8 TO 10

A unidirectional base prepreg was produced by the hot melt method from the resin composition shown in Table 5 and a high-strength, medium-elastic modulus carbon fiber (MR50K produced by Mitsubishi Rayon Co., Ltd.; tensile strength, 5600 MPa; modulus of elasticity, 300 GPa; elongation at breaking point, 1.8%). The CF weight of the base prepreg was 145 g/m$^2$, and the resin content thereof was 31 wt.%.

This base prepreg was wound at the both sides with polyetherimide multifilaments (modulus of elasticity, about 4 GPa; total denier, 300 d; number of filaments, 24 fil) by the filament winding method so that the fiber weight per side was 8 g/m$^2$. Thus, the prepreg of the present invention was obtained.

Using this prepreg, the compressive strength after application of impact was measured in the same manner as in Example 1 except that the curing condition was changed to 180° C.×6 hours, and that post-curing was further carried out at 214° C. for 6 hours.

The compressive strength after application of impact obtained is shown in Table 5.

Further, a unidirectional base prepreg was produced in the same manner as in Examples 22 and 24 except that a resin film in which the resin content of the prepreg was 36 wt.%, was used. The compressive strength after application of impact was then measured without adhering the polyetherimide multifilament to the prepreg.

The compressive strength after application of impact obtained is shown in Table 5.

component was 5(6)-amino-1-(4'-aminophenyl)-1,3-trimethylindane. The compressive strength after application of impact was then measured. The results are shown in Table 6.

EXAMPLES 27 AND 28

The base prepreg of the present invention was obtained in the same manner as in Examples 22 and 23 except that the polyetherimide multifilament was replaced by the multifilament (modulus of elasticity, about 4 GPa; total denier, 356 d; number of filaments, 234 fil) of a polyimide (P-84 produced by LENZING AG) of which the acid component was benzophenonetetracarboxylic acid anhydride and the diamine component was a mixture of toluenediamine and 4,4'-diaminodiphenylmethane. The compressive strength after application of impact was then measured. The results are shown in Table 6.

TABLE 6

|  |  | Example 25 | Example 26 | Example 27 | Example 28 |
|---|---|---|---|---|---|
| Blending of components (B) | 4,4'-Bismaleimidodiphenylmethane | 100 |  | 100 |  |
|  | Bismaleimide eutectic mixture |  | 100 |  | 100 |
|  | Diallyl bisphenol A | 75 | 40 | 75 | 40 |
| (C) | Polyimide Matrimide 5218 | 8.0 | 8.0 | 0 | 0 |
| (g/cm$^2$) | P-84 |  |  | 8.0 | 8.0 |
| Compressive strength after application of impact (MPa) |  | 270 | 220 | 230 | 190 |

Note: Bismaleimide eutectic mixture: Eutectic mixture of 4,4'-bismaleimidodiphenylmethane, 1,6-bismaleimide(2,2,4-trimethyl)hexane and bismaleimidotoluene.

EXAMPLES 29 TO 32 AND COMPARATIVE EXAMPLES 11 AND 12

A unidirectional base prepreg was produced by the method shown in Table 7 from the resin composition shown in Table 7 and a high-strength, medium-elastic modulus carbon fiber (MR50K). The CF weight of the base prepreg was 145 g/m$^2$, and the resin content thereof was 34 wt.%.

This base prepreg was wound at the both sides with nylon 12 multifilaments (modulus of elasticity, about 2 GPa; total denier, 81 d; number of filaments, 36 fil) by the filament winding method so that the fiber weight per side was 3 g/m$^2$. Thus, the prepreg of the present invention was obtained.

Using this prepreg, the compressive strength after application of impact was measured in the same manner as in Example 1 to obtain the values shown in Table 7.

Further, a unidirectional base prepreg was produced in the same manner as in Examples 29 and 30 except that the amount of the resin was regulated so that the resin content of the prepreg was 36 wt.%. The compressive strength after application of impact was then measured

TABLE 5

|  |  | Example |  |  | Comparative Example |  |  |
|---|---|---|---|---|---|---|---|
|  |  | 22 | 23 | 24 | 8 | 9 | 10 |
| Blending of components (B) | 4,4'-Bismaleimido diphenylmethane | 100 |  |  | 100 |  |  |
|  | Bismaleimide eutectic mixture |  | 100 | 100 |  | 100 | 100 |
|  | Diallyl bisphenol A | 75 | 40 | 35 | 75 | 35 | 40 |
|  | Diallyl bisphenol F |  |  | 5 |  | 5 |  |
| (C) | Polyetherimide (g/m$^2$) | 8.0 | 8.0 | 8.0 | 0 | 0 | 0 |
| Compressive strength after application of impact (MPa) |  | 260 | 200 | 210 | 200 | 170 | 155 |

Note: Bismaleimide eutectic mixture: Eutectic mixture of 4,4'-bismaleimidodiphenylmethane, 1,6-bismaleimide(2,2,4-trimethyl)hexane and bismaleimidotoluene.

EXAMPLES 25 AND 26

The base prepreg of the present invention was obtained in the same manner as in Examples 22 and 23 except that the polyetherimide multifilament was replaced by the multifilament (modulus of elasticity, about 4 GPa; total denier, 250 d; number of filaments, 24 fil) of a polyimide (Matrimid 5218 produced by Ciba Geigy Co.) of which the acid component was benzophenonetetracarboxylic acid anhydride and the diamine without adhering the nylon 12 multifilaments to the prepreg to obtain the values shown in Table 7.

EXAMPLE 33

The prepreg of the present invention was obtained in the same manner as in Example 31 except that the amount of the resin was regulated so that the resin content of the base prepreg was 31 wt.%, the multifilament (modulus of elasticity, about 4 GPa; total denier, 250 d; number of filaments, 36 fil) of a polyethersulfone (VICTREX 5003 produced by ICI) was used in place of the nylon 12 multifilament, and that winding was carried out so that the amount of polyethersulfone adhered to one side of the base prepreg was 8 g/m². The compressive strength after application of impact was then measured to find that it was 255 MPa.

EXAMPLE 34

The base prepreg of the present invention was obtained in the same manner as in Example 33 except that a polyetherimide multifilament (modulus of elasticity, about 4 GPa; total denier, 300 d; number of filaments, 24 fil) was used in place of the polyethersulfone. The compressive strength after application of impact was then measured to find that it was 285 MPa.

GPa; total denier, 81 d; number of filaments, 36 fil) by the filament winding method so that the fiber weight per side was 3 g/m². Thus, the prepreg of the present invention was obtained.

Using this prepreg, the compressive strength after application of impact was measured in the same manner as in Example 1 to obtain the values shown in Table 8.

Further, a unidirectional base prepreg was produced in the same manner as in Examples 35 to 37 except that the amount of the resin was regulated so that the resin content of the prepreg was 36 wt.%. The compressive strength after application of impact was then measured without adhering the nylon 12 multifilaments to the prepreg to obtain the values shown in Table 8.

EXAMPLE 38

The base prepreg of the present invention was obtained in the same manner as in Example 35 except that the amount of the resin was regulated so that the resin content of the base prepreg was 31 wt.%, the multifilament (modulus of elasticity, about 4 GPa; total denier, 250 d; number of filaments, 36 fil) of a polyethersulfone (VICTREX 5003 produced by ICI) was used in place of the nylon 12 multifilament, and that winding was carried out so that the amount of the polyethersulfone

TABLE 7

| | | Example | | | | Comparative Example | |
|---|---|---|---|---|---|---|---|
| | | 29 | 30 | 31 | 32 | 11 | 12 |
| Prepreg-manufacturing method | | Hot melt method | Lacquer method (Solvent: MEK) | Hot melt method | Lacquer method (Solvent: MEK) | Hot melt method | Lacquer method (Solvent: MEK) |
| Blending of components (B) | Aro Cy B-30 | 100 | | 50 | | 100 | |
| | Aro Cy M-30 | | 100 | | | | 100 |
| | Aro Cy L-10 | | | 50 | | | |
| | Xu 71787 | | | | 100 | | |
| | Nonylphenol | 6 | 6 | 6 | | 6 | 6 |
| | Copper naphthenate | 0.25 | 0.25 | 0.25 | | 0.25 | 0.25 |
| | Cobalt naphthenate | | | | 0.05 | | |
| Component (C) | (Nylon 12) (g/m²) | 6.0 | 6.0 | 6.0 | 6.0 | None | None |
| Compressive strength after application of impact (MPa) | | 280 | 275 | 295 | 250 | 222 | 212 |

Note:
Aro Cy B-30: Prepolymer of 2,2'-bis(4-cyanatophenyl) propane (produced by Hi-Tek Polymers Co.)
Aro Cy M-30: Prepolymer of bis(3,5-dimethyl-4-cyanatophenyl)methane (produced by Hi-Tek Polymers Co.)
Aro Cy L-10: 2,2'-bis(4-cyanatophenyl)ethane (produced by Hi-Tek Polymers Co.)
Xu 71787: Same compound as that represented by the formula (I) (produced by Dow Chemical Co.)

Note :
Aro Cy B-30 : Prepolymer of 2,2'-bis(4-cyanatophenyl) propane (produced by Hi-Tek Polymers Co.)
Aro Cy M-30 : Prepolymer of bis(3,5-dimethyl-4-cyanatophenyl)methane (produced by Hi-Tek Polymers Co.)
Aro Cy L-10 : 2,2'-Bis(4-cyanatophenyl)ethane (produced by Hi-Tek Polymers Co.)
Xu71787 : Same compound as that represented by the formula (I) (produced by Dow Chemical Co.)

EXAMPLES 35 TO 37 AND COMPARATIVE EXAMPLES 13 TO 15

A unidirectional base prepreg was produced by the hot melt method from the resin composition shown in Table 8 and a high-strength, medium-elastic modulus carbon fiber MR50K. The CF weight of the base prepreg was 145 g/m², and the resin content thereof was 34 wt.%.

This base prepreg was wound at the both sides with nylon 12 multifilaments (modulus of elasticity, about 2 adhered to one side of the prepreg was 8 g/m². The compressive strength after application of impact was then measured to find that it was 240 MPa.

EXAMPLE 39

The base prepreg of the present invention was obtained in the same manner as in Example 38 except that a polyetherimide multifilament (modulus of elasticity, about 4 GPa; total denier, 300 d; number of filaments, 24 fil) was used in place of the polyethersulfone. The compressive strength after application of impact was then measured to find that it was 278 MPa.

EXAMPLE 40

The base prepreg of the present invention was obtained in the same manner as in Example 38 except that the multifilament (modulus of elasticity, about 3 GPa; total denier, 300 d; number of filaments, 50 fil) of a polyarylsulfone (RADEL A-200 produced by Amoco Co., Ltd.) was used in place of the polyethersulfone.

The compressive strength after application of impact was then measured to find that it was 265 MPa.

TABLE 8

|  |  | Example | | | Comparative Example | | |
| --- | --- | --- | --- | --- | --- | --- | --- |
|  |  | 35 | 36 | 37 | 13 | 14 | 15 |
| Blending of components (B) | Bis(4-maleimidophenyl)methane | 10 | 10 | 20 | 10 | 10 | 20 |
|  | BCN | 90 | 90 | 80 | 90 | 90 | 80 |
|  | Bisphenol A type epoxy resin (Epikote 828) | 12.5 | 6.0 | 12.5 | 12.5 | 6.0 | 12.5 |
|  | Polyester A | 12.5 | 6.0 | 12.5 | 12.5 | 6.0 | 12.5 |
|  | Silicon dioxide fine powder | 1.25 | 1.25 | 1.25 | 1.25 | 1.25 | 1.25 |
|  | Dicumyl peroxide | 0.2 | 0.2 | 0.2 | 0.2 | 0.2 | 0.2 |
| (C) | Nylon 12 (g/m$^2$) | 6.0 | 6.0 | 6.0 | 0 | 0 | 0 |
| Compressive strength after application of impact (MPa) |  | 282 | 263 | 255 | 220 | 200 | 190 |

Note:
BCN: 2,2'-Bis(4-cyanatophenyl)propane
Polyester A: Polyester having a softening point of 25° C. obtained from neopentyl glycol and terephthalic acid
Silicon dioxide fine powder: Aerosil 380 (trade name of Nippon Aerosil Co., Ltd.)

EXAMPLES 41 TO 43

A unidirectional base prepreg was produced by the hot melt method from the resin composition shown in Table 9 and a high-strength, medium-elastic modulus carbon fiber (MR60P). The CF weight of the base prepreg was 190 g/m$^2$, and the resin content thereof was 34 wt.%.

Nylon 12 multifilaments (90 d/36 fil) were arranged on the both sides of this base prepreg at a pitch of 3 mm using the processes shown in FIGS. 1 and 2 to obtain the prepreg of the present invention.

Using this prepreg, the compressive strength after application of impact was measured in the same manner as in Example 1 to obtain the values shown in Table 9.

TABLE 9

|  |  | Example 41 | Example 42 | Example 43 |
| --- | --- | --- | --- | --- |
| Blending of components (B) | Tetraglycidyldiamine type epoxy resin (YH 434L) | 40 | 40 | 40 |
|  | Triglycidyldiamine type epoxy resin (ELM-100) | 20 | 40 | 40 |
|  | Bisphenol A type epoxy resin (Epikote 828) | 40 | 20 | 20 |
|  | Diaminodiphenyl sulfone | 50 | 50 | 50 |
|  | Polyether sulfone |  |  | 10 |
| Compressive strength after application of impact (MPa) |  | 339 | 330 | 336 |

EXAMPLES 44 TO 46

Using the process shown in FIG. 3, the unidirectional base prepreg of the present invention was produced according to the hot melt method in which a high-strength, medium-elastic modulus carbon fiber (MR60P) and nylon 12 multifilaments (90 d/36 fil) were simultaneously supplied to a resin film in which the resin composition shown in Table 10 had been coated onto a release paper. In this case, the nylon 12 multifilaments were supplied so that they were arranged at a pitch of 3 mm.

The CF weight of this prepreg was 190 g/m$^2$, and the ratio of the carbon fiber and thermosetting matrix resin was 66 to 34 by weight.

Using this prepreg, the compressive strength after application of impact was measured in the same manner as in Example 1 to obtain the values shown in Table 10.

TABLE 10

|  |  | Example 44 | Example 45 | Example 46 |
| --- | --- | --- | --- | --- |
| Blending of components (B) | Tetraglycidyldiamine type epoxy resin (YH 434L) | 40 | 40 | 40 |
|  | Triglycidyldiamine type epoxy resin (ELM-100) | 20 | 40 | 40 |
|  | Bisphenol A type epoxy resin (Epikote 828) | 40 | 20 | 20 |
|  | Diaminodiphenyl sulfone | 50 | 50 | 50 |
|  | Polyether sulfone |  |  | 10 |
| Compressive strength after application of impact (MPa) |  | 327 | 315 | 322 |

EXAMPLES 47 TO 49

Using the process shown in FIG. 4, a resin film in which nylon 12 multifilaments (90 d/36 fil) had been arranged and fixed at regular intervals was produced by supplying the multifilaments so as to be arranged and fixed at a pitch of 3 mm on a resin film in which the resin composition shown in Table 11 had been coated onto a release paper.

The unidirectional base prepreg of the present invention was produced by the usual hot melt method from the resin film thus obtained and a high-strength, medium-elastic modulus carbon fiber MR60P.

The CF weight of this prepreg was 190 g/m$^2$, and the ratio of the carbon fiber and thermosetting matrix resin was 66 to 34 by weight.

Using this prepreg, the compressive strength after application of impact was measured in the same manner as in Example 1 to obtain the values shown in Table 11.

TABLE 11

|  |  | Example 47 | Example 48 | Example 49 |
| --- | --- | --- | --- | --- |
| Blending of components (B) | Tetraglycidyldiamine type epoxy resin (YH 434L) | 40 | 40 | 40 |
|  | Triglycidyldiamine type epoxy resin (ELM-100) | 20 | 40 | 40 |
|  | Bisphenol A type epoxy resin (Epikote 828) | 40 | 20 | 20 |
|  | Diaminodiphenyl sulfone | 50 | 50 | 50 |
|  | Polyether sulfone |  |  | 10 |
| Compressive strength after application of impact (MPa) |  | 335 | 330 | 337 |

EXAMPLE 50

A unidirectional base prepreg was produced by the hot melt method from the resin composition shown in Table 12 and a high-strength, medium-elastic modulus carbon fiber MR60P. The CF weight of this base prepreg was 190 g/m², and the resin content thereof was 34 wt.%. This base prepreg was wound at the both sides with nylon 12 multifilaments (45 d/36 fil) at a pitch of 2.5 mm to obtain the prepreg of the present invention.

Using this prepreg, the compressive strength after application of impact was measured in the same manner as in Example 1 to obtain the values shown in Table 12.

Figure 5:
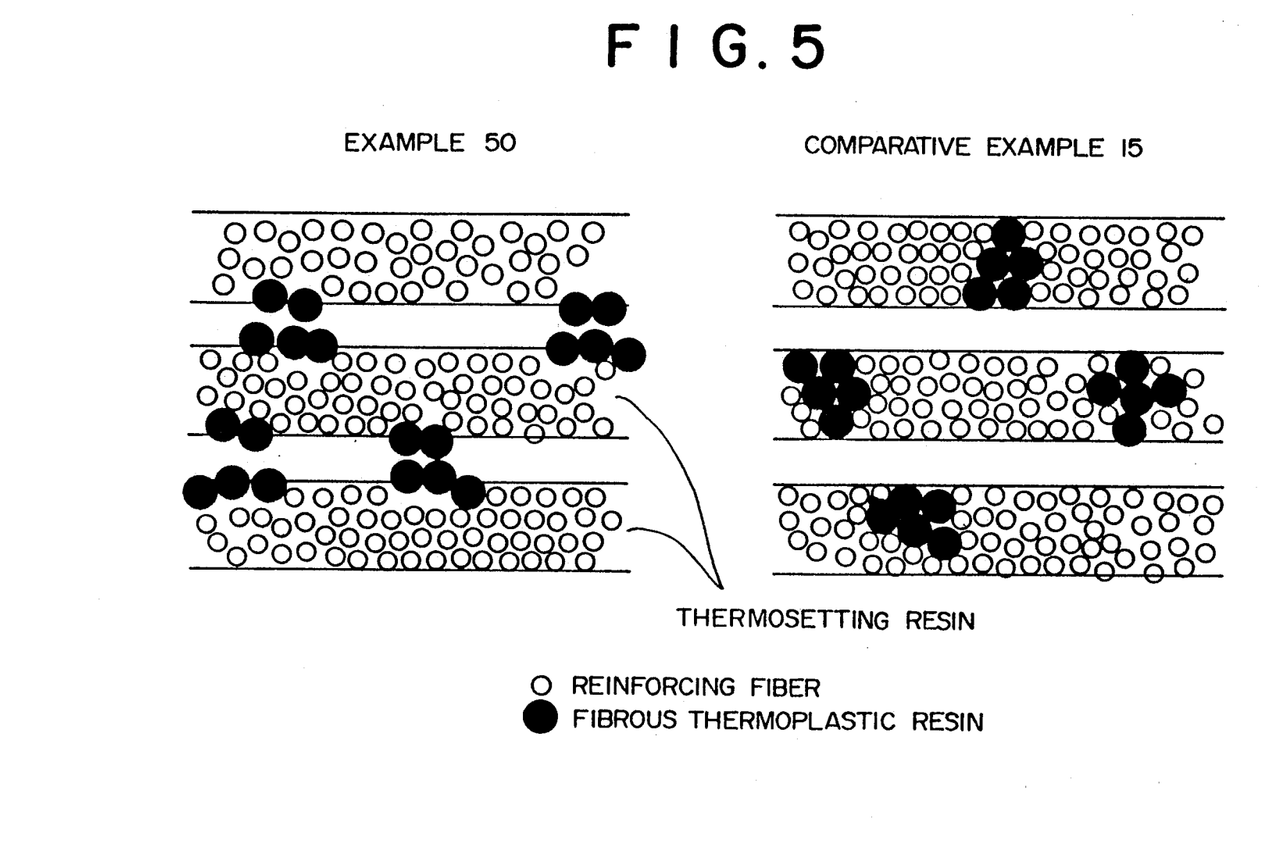
FIG. 5 shows schematic views of the sections of prepregs laid one upon another before autoclave molding obtained in an example of the present invention and a comparative example.

The section of the resulting composite was examined with a microscope to observe that a part of the nylon 12 multifilaments arranged at regular intervals between the layers intruded, in a molten state, into the surface of the base prepreg (refer to FIG. 5).

COMPARATIVE EXAMPLE 16

A comparative prepreg was obtained in the same manner as in Example 50 except that the prepreg was produced so that the nylon 12 multifilament (45 d/36 fil) was completely buried in the inner part of the base prepreg.

Using this prepreg, the compressive strength after application of impact was measured in the same manner as in Example 1 to obtain the values shown in Table 12.

The section of the resulting composite was examined with a microscope to observe that the nylon 12 multifilament was not present between the layers, but the molten multifilament was present at regular intervals in the inside of the layers (refer to FIG. 5).

It can be seen from this result that the compressive strength after application of impact is largely improved by concentrating the fibrous thermoplastic resin between the layers.

TABLE 12

| | | Example 50 | Comparative Example 16 |
|---|---|---|---|
| Blending of components (B) | Tetraglycidyldiamine type epoxy resin (YH 434L) | 27 | 27 |
| | Triglycidyldiamine type epoxy resin (ELM-100) | 13 | 13 |
| | Bisphenol A type epoxy resin (Epikote 828) | 27 | 27 |
| | Diaminodiphenyl sulfone | 33 | 33 |
| (C) | Nylon 12 | Present in a state wherein a part of the nylon 12 was partially buried in the outer surface of the prepreg. | Completely buried in the prepreg. |
| Compressive strength after application of impact (MPa) | | 352 | 270 |

We claim:

1. A prepreg for fiber-reinforced composite materials, comprising:
   A) a reinforcing fiber having a modulus of elasticity of 200 GPa or more,
   B) a thermoplastic monofilament or multifilament having a modulus of elasticity of 100 GPa or less, and
   C) a thermosetting matrix resin, said thermoplastic monofilament or multifilament (B) being localized and unidirectionally arranged at regular intervals of 1 to 5 mm on the outer surface of the prepreg.

2. A prepreg according to claim 1, wherein the weight ratios of the components (A), (B) and (C) are in the following ranges:

A/C=55/45 to 85/15

B/C=0.5/100 to 40/100.

3. A prepreg according to claim 2, wherein the weight ratio of the components (A) and (C) is in the following range:

A/C=60/40 to 75/25.

4. A prepreg according to claim 3, wherein the weight ratio of the components (B) and (C) is in the following range:

B/C=0.5/100 to 20/100.

5. A prepreg according to claim 1, wherein the component (C) is a thermosetting matrix resin comprising an epoxy resin as a main component.

6. A prepreg according to claim 4, wherein the component (C) is a thermosetting matrix resin comprising an epoxy resin as a main component.

7. A prepreg according to claim 5, wherein the fibrous thermoplastic resin (B) is a thermoplastic resin having a functional group which can react with an epoxy group.

8. A prepreg according to claim 7, wherein the functional group which can react with an epoxy group is one or more members selected from the group consisting of an amino group, an amide group, a hydroxyl group, a carboxylic group, an isocyanate group and a mercapto group.

9. A prepreg according to claim 1, wherein the component (C) is a thermosetting matrix resin comprising a polyfunctional maleimide as a main component.

10. A prepreg according to claim 3, wherein the component (C) is a thermosetting matrix resin comprising a polyfunctional maleimide as a main component.

11. A prepreg according to claim 10, wherein the thermosetting matrix resin comprising a polyfunctional maleimide as a main component is a resin composition comprising as main components the polyfunctional maleimide and an alkenylphenol copolymerizable with the polyfunctional maleimide.

12. A prepreg according to claim 1, wherein the component (C) is a thermosetting matrix resin comprising a polyfunctional cyanic acid ester as a main component.

13. A prepreg according to claim 3, wherein the component (C) is a thermosetting matrix resin comprising a polyfunctional cyanic acid ester as a main component.

14. A prepreg according to claim 1, wherein the component (C) comprises as a main component a mixture of the polyfunctional maleimide (I) and the polyfunctional cyanic acid ester or its oligomer (II) or a pre-reaction product of (I) and (II).

15. A prepreg according to claim 3, wherein the component (C) comprises as a main component a mixture of the polyfunctional maleimide (I) and the polyfunctional cyanic acid ester or its oligomer (II) or a pre-reaction product of (I) and (II).

16. A prepreg according to claim 1, wherein the fibrous thermoplastic resin (B) is obtained by conjugated-spinning two or more kinds of thermoplastic resin.

17. A process for producing a prepreg according to claim 1, comprising coating a release paper with a thermosetting matrix resin (C), simultaneously supplying thereto a reinforcing fiber (A) and a fibrous thermoplastic resin (B) and then carrying out impregnation.

18. A process for producing a prepreg according to claim 1, comprising arranging a fibrous thermoplastic resin (B) on a base prepreg obtained from a reinforcing fiber (A) and a thermosetting matrix resin (C) and then carrying out heating and impregnation.

19. A process for producing a prepreg according to claim 1, comprising coating a release paper with a thermosetting matrix resin (C), arranging thereon and fixing thereto a fibrous thermoplastic resin (B), then laying thereon a reinforcing fiber (A) and carrying out impregnation.

20. A laminate in which layers comprising a fibrous thermoplastic resin (B) have been formed at the interfaces of the laminate in which pieces of a prepreg of claim 2 comprising a reinforcing fiber (A) and a thermosetting matrix resin (C) have been laid one upon another.

* * * * *